US008968561B2

(12) United States Patent
Kono et al.

(10) Patent No.: US 8,968,561 B2
(45) Date of Patent: Mar. 3, 2015

(54) PREPARATIVE SEPARATION/PURIFICATION SYSTEM

(75) Inventors: Yutaka Kono, Kyoto (JP); Masayuki Nishimura, Kyoto (JP); Bob Boughtflower, Ware (GB); Przemyslaw Stasica, Stevenage (GB)

(73) Assignee: Shimadzu Corporation, Kyoto (JP)

( * ) Notice: Subject to any disclaimer, the term of this patent is extended or adjusted under 35 U.S.C. 154(b) by 863 days.

(21) Appl. No.: 12/681,318

(22) PCT Filed: Oct. 2, 2007

(86) PCT No.: PCT/JP2007/001071
§ 371 (c)(1),
(2), (4) Date: Jul. 20, 2010

(87) PCT Pub. No.: WO2009/044427
PCT Pub. Date: Apr. 9, 2009

(65) Prior Publication Data
US 2010/0276350 A1 Nov. 4, 2010

(51) Int. Cl.
*B01D 15/20* (2006.01)
*B01D 15/16* (2006.01)

(52) U.S. Cl.
CPC .............. *B01D 15/20* (2013.01); *B01D 15/166* (2013.01)
USPC ........................................ 210/198.2; 210/656

(58) Field of Classification Search
CPC ................................ B01D 15/20; B01D 15/166
USPC .............. 210/198.2, 635, 656, 96.1, 101, 143
See application file for complete search history.

(56) References Cited

U.S. PATENT DOCUMENTS

| 4,806,250 | A   * | 2/1989  | Takata et al. ................... 210/659 |
| 5,117,109 | A   * | 5/1992  | Asakawa et al. ............... 250/288 |
| 6,498,040 | B1  * | 12/2002 | Yokoyama et al. ........... 436/161 |
| 6,942,793 | B2  * | 9/2005  | Ito et al. ...................... 210/198.2 |
| 7,862,724 | B2  * | 1/2011  | Osaka ........................... 210/656 |
| 2002/0117447 | A1  * | 8/2002 | Wheat et al. .................. 210/656 |

FOREIGN PATENT DOCUMENTS

| EP | 1455185 A1 | 9/2004 |
| JP | 61-056970 A | 3/1986 |
| JP | 62-019758 A | 1/1987 |

(Continued)

OTHER PUBLICATIONS

PTO Translation No. 10-4653 of Japan Patent No. 2003149217.*
PTO Translation No. 10-4654 of Japan Patent No. 02122260.*
PTO Translation No. 11-2362 of Japan Patent No. 2005189170.*
PTO Translation No. 11-2363 of Japan Patent No. 62019758.*

(Continued)

*Primary Examiner* — Ernest G Therkorn
(74) *Attorney, Agent, or Firm* — Sughrue Mion, PLLC (57) ABSTRACT

A mixed liquid passage (31) is connected to a trapping passage (22) at a point upstream of a trap column (23). A mixture of a diluting liquid and an additive agent, which are respectively drawn and sent by pumps (35) and (36), is supplied into the mixed liquid passage (31). When an eluate containing a target compound is passed through the trap column (23), the eluate is diluted with the diluting liquid and hence its elution capability decreases, so that the target compound can be easily captured in the trap column (23). Meanwhile, the solubility of the mobile phase in the eluate decreases, causing not only the target component but also foreign compounds to more easily precipitate. However, their precipitation is prevented by the effect of the additive agent. Thus, clogging of the trap column (23) or pipes is prevented.

16 Claims, 2 Drawing Sheets

(56) References Cited

FOREIGN PATENT DOCUMENTS

| | | |
|---|---|---|
| JP | 02-122260 A | 5/1990 |
| JP | 2003-149217 A | 5/2003 |
| JP | 2004-516474 A | 6/2004 |
| JP | 2005-189170 A | 7/2005 |
| JP | 2005-221425 A | 8/2005 |

OTHER PUBLICATIONS

Machine Language Translation of JP 2005-221425 undated.*
Japanese Office Action dated Jun. 7, 2011, issued in corresponding Japanese Patent Application No. 2009-535887.
Office Action dated Dec. 19, 2011, for the corresponding United Kingdom Patent Application No. 1006550.6.

* cited by examiner

PREPARATIVE SEPARATION/PURIFICATION SYSTEM

CROSS REFERENCE TO RELATED APPLICATIONS

This application is a 371 National Stage of International Application No. PCT/JP2007/001071 filed Oct. 2, 2007, the contents of all of which are incorporated herein by reference in their entirety.

TECHNICAL FIELD

The present invention relates to a preparative separation/purification system for separately purifying and collecting one or more components individually extracted from a solution by a liquid chromatograph. More specifically, it relates to a preparative separation/purification system using a trap column for temporarily capturing a target component.

BACKGROUND ART

For example, in the pharmaceutical industry, preparative separation/purification systems utilizing liquid chromatographs are used to collect samples of a variety of chemically synthesized compounds in order to store those samples in a library or analyze them in more detail. Conventional examples of the preparative separation/purification system are disclosed in Patent Documents 1 and 2.

In these conventional apparatuses, target components (compounds) in a sample solution are temporally separated by a liquid chromatograph. The separated target components are then respectively introduced into different trap columns and temporarily captured therein. Subsequently, a solvent is supplied into each trap column to quickly elute the component from the trap column and collect it in a container. Thus, a plurality of solutions each containing one target component at a high concentration are respectively collected in a plurality of containers. These separately collected solutions are then subjected to a vaporizing and drying process to remove the solvent and collect the target components in solid forms.

To improve the collection rate of the target component in this type of preparative separation/purification system, it is necessary to assuredly capture the target compound by the trap column. For this purpose, it is desirable to maximally decrease the elution capability of the solvent (mobile phase) used for introducing a solution containing the target component into the trap column. For example, in the case of a trap column that works in a reverse-phase mode, the adsorbent contained in the trap column is hydrophobic, while the mobile phase is hydrophilic. In this case, using a more hydrophilic mobile phase will make the target compound more strongly held on the adsorbent. Accordingly, some systems dilute the mobile phase with water to lower its elution capability by mixing water, supplied by a separate pump, into the mobile phase at a point before the inlet of the trap column when an eluate containing a target compound separated by a column of a preparative liquid chromatograph is introduced into the trap column.

However, lowering the elution capability of the mobile phase in this manner decreases not only the solubility of the target compound in the mobile phase but also that of foreign compounds. As a result, the target and foreign compounds both easily precipitate within a pipe or trap column, causing clogging or similar problems and thereby impeding the flow of the solutions.

Furthermore, even if a diluting liquid, such as water, is mixed into the mobile phase, the adsorbent in the trap column cannot exhibit an adequate retaining power for some kinds of compounds but allows those compounds to pass through the trap column. This not only results in a failure of the preparative separation but may also cause a loss of the synthesized pharmacological compound. Naturally, it is possible to improve the efficiency of capturing the compound with the trap column by appropriately setting the trapping conditions, such as the kind of adsorbent to be filled into the trap column, the kind of mobile phase or the liquid-supply velocity. However, in the pharmaceutical industry, the preparative separation/purification needs to be performed on such a wide variety of compounds that it requires an extreme amount of time, labor and cost to determine optimal conditions for each and every compound. Therefore, a more versatile preparative separation/preparation method that does not require changing the trapping conditions for a variety of compounds has been requested. However, none of the conventional systems could meet with this requirement.

Patent Document 1: Japanese Unexamined Patent Application Publication No. H02-122260
Patent Document 2: Japanese Unexamined Patent Application Publication No. 2003-149217

DISCLOSURE OF THE INVENTION

Problem to be Solved by the Invention

The present invention has been developed in view of the previously described problems, and its primary target is to provide a preparative separation/purification system capable of assuredly capturing a target compound with high levels of efficiency while preventing clogging or other problems of the trap column or pipes.

Means for Solving the Problems

The present invention aimed at solving the previously described problems is a preparative separation/purification system in which a target component contained in a liquid sample is captured by a trap column, an eluting solvent is subsequently supplied into the trap column to elute the target component, and the solvent in an eluate is vaporized to obtain the target component in solid forms, which is characterized by including:

a) a trapping passage, in the course of which the aforementioned trap column is provided;

b) a solution supply means for sending, to the trapping passage, a solution having the target component dissolved in a sample-introducing solvent;

c) a diluting liquid supply passage for merging a diluting liquid into the solution at a point before the trap column in the trapping passage in order to lower the elution capability of the sample-introducing solvent;

d) a diluting liquid supply means, provided in the diluting liquid supply passage, for supplying the diluting liquid; and e) an additive-mixing means for mixing into the diluting liquid an additive agent for preventing the target component and a foreign compound in the solution from precipitating due to a decrease in the elution capability of the solvent caused by the mixture of the diluting liquid.

For example, the sample-introducing solvent may be an organic solvent, such as acetonitrile or a mixture of acetonitrile and water, and the diluting liquid may be water. As for the additive agent, a high-polarity compound whose polarity is higher than that of the organic solvent used as the mobile phase is appropriate since such a solvent can increase the solubility of the target and foreign components without significantly promoting their elution from the trap column. Examples of such additive agents include dimethylformamide (DMF), dimethyl sulfoxide (DMSO) and single-chain alcohols.

In the preparative separation/purification system according to the present invention, a solution with the target component dissolved therein is supplied by the solution supply means into the trapping passage in the process of capturing a target component. Simultaneously, a diluting liquid with an additive agent mixed therein is supplied by the additive-mixing means through the diluting liquid supply passage into the trapping passage. Thus, the solution with the target component dissolved therein is introduced into the trap column after it has been diluted with the diluting liquid and the additive agent has been mixed into it. Diluting the solution decreases the elution capability of the sample-introducing solvent, so that the target component dissolved in the solution can be more easily captured by the stationary phase (e.g. an adsorbent) in the trap column. Thus, the component is assuredly captured.

Diluting the sample-introducing solvent decreases the solubility of not only the target component but also various kinds of foreign components other than the target one, thereby facilitating the precipitation of all these components. However, the additive agent effectively suppresses the precipitation of these target and foreign components and thereby impedes their deposition. Thus, clogging of the trap column and pipes constituting the trapping passage is prevented.

It should be noted that different compounds have different levels of ease in being captured onto the stationary phase of the trap column and therefore it is necessary to properly adjust the extent of lowering the elution capability and the degree of suppressing the precipitation of the target and foreign components. Accordingly, in the preparative separation/purification system according to the present invention, it is preferable that the additive-mixing means changes, with time, the compositional ratio of the diluting liquid and the additive agent.

For this purpose, in one possible mode of the present invention, the additive-mixing means includes:

an additive supply passage connected to a point on the diluting liquid supply passage;

an additive supply means for drawing and supplying the additive agent in the additive supply passage; and a control means for changing the liquid supply rates of the diluting liquid supply means and the additive supply means so that the compositional ratio of the diluting liquid and the additive agent changes with time.

In this mode of configuration, the diluting liquid and the additive agent (or a plurality of solutions each consisting of the diluting liquid with the additive agent mixed at a different concentration) are individually drawn and supplied by a separate supply means (e.g. a pump), and the diluting liquid and the additive agent are subsequently merged together at a downstream point. The control means changes the mixture ratio of the diluting liquid and the additive agent by changing the liquid-supplying rate of both supply means (or one of them) with time. Namely, this corresponds to a high-pressure gradient liquid-supply apparatus in a liquid chromatograph.

In another mode of the preparative separation/purification system according to the present invention, the additive-mixing means includes:

a passage selection means for switching, between the diluting liquid and the additive agent, the liquid to be drawn by the diluting liquid supply means; and a control means for controlling the period of time to connect each passage by the passage selection means so as to change the compositional ratio of the diluting liquid and the additive agent with time.

In this mode of configuration, either the diluting liquid or the additive agent appropriately selected by the passage selection means (e.g. a selector valve) is drawn by the sole supply means (e.g. a pump). The diluting liquid and the additive agent that have been drawn at different points in time are mixed with each other at the supply means and sent through the diluting liquid supply passage into the trapping passage. The periods of time during which the diluting liquid and the additive agent are respectively selected by the passage selection means are changed with time by the control means so as to vary the mixture ratio of the diluting liquid and the additive agent. Namely, this corresponds to a low-pressure gradient liquid-supply apparatus in a liquid chromatograph.

In some cases, e.g. if the sample-introducing solvent has an extremely high elution capability, diluting the solvent with some liquid may not sufficiently lower the elution capability but allows the target component to pass through the trap column without being captured by it. In such a case, it is possible to adopt, as the additive agent, an additive agent capable of preventing precipitation in the sample-introducing solvent and also adjusting the degree of retention of the target component on the stationary phase in the trap column working in a reverse-phase mode by controlling the hydrophilic or hydrophobic characteristics of the solvent. This method enables the same trap column to capture a larger variety of compounds and thereby expands the application range of the system.

The preparative separation/purification system according to the present invention may be used in such a manner that a solution that is previously separated by a fraction collector of a preparative liquid chromatograph, with the target component contained therein, is supplied into the solution supply passage to capture the target component in the trap column. Alternatively, it is also possible to directly connect the system to a liquid chromatograph to construct an online trapping system. Namely, it is possible to introduce the sample-introducing solvent, with a liquid sample carried thereby, into a separation column of a liquid chromatograph and to supply an eluate from the separation column into the aforementioned trapping passage so that a target component in the eluate will be captured by the trap column.

Effect of the Invention

The preparative separation/purification system according to the present invention can capture a target component into the trap column with a high level of capturing efficiency without causing clogging of the trap column or pipes. As a result, the process of capturing a component can be performed in a stable manner for a variety of compounds and those compounds can be efficiently obtained in solid forms.

EXPLANATION OF NUMERALS

1 . . . Liquid Chromatograph Unit
2 . . . First Mobile Phase Container
3 . . . Second Mobile Phase Container
4, 5 . . . . Pump
6 . . . Mixer
7 . . . Injector
8 . . . Separation Column
9 . . . First Detector
10 . . . Fraction Collector
11 . . . Second Detector
20 . . . Trapping Unit
21, 26 . . . Six-Port Valve
22 . . . Trapping Passage
23 . . . Trap Column
24 . . . Mixing Coil
25 . . . T-Joint
27 . . . First Washing Liquid Container
28 . . . Second Washing Liquid Container
29, 38, 43 . . . Two-Way Valve
30, 35, 36, 40, 44 . . . Pump
31 . . . Mixed Liquid Passage
32 . . . Eight-Way Valve
33 . . . Diluting Liquid Container
34 . . . Additive Agent Container
37 . . . Mixer
39 . . . Eluting Solvent Container

BEST MODE FOR CARRYING OUT THE INVENTION

Figure 1:
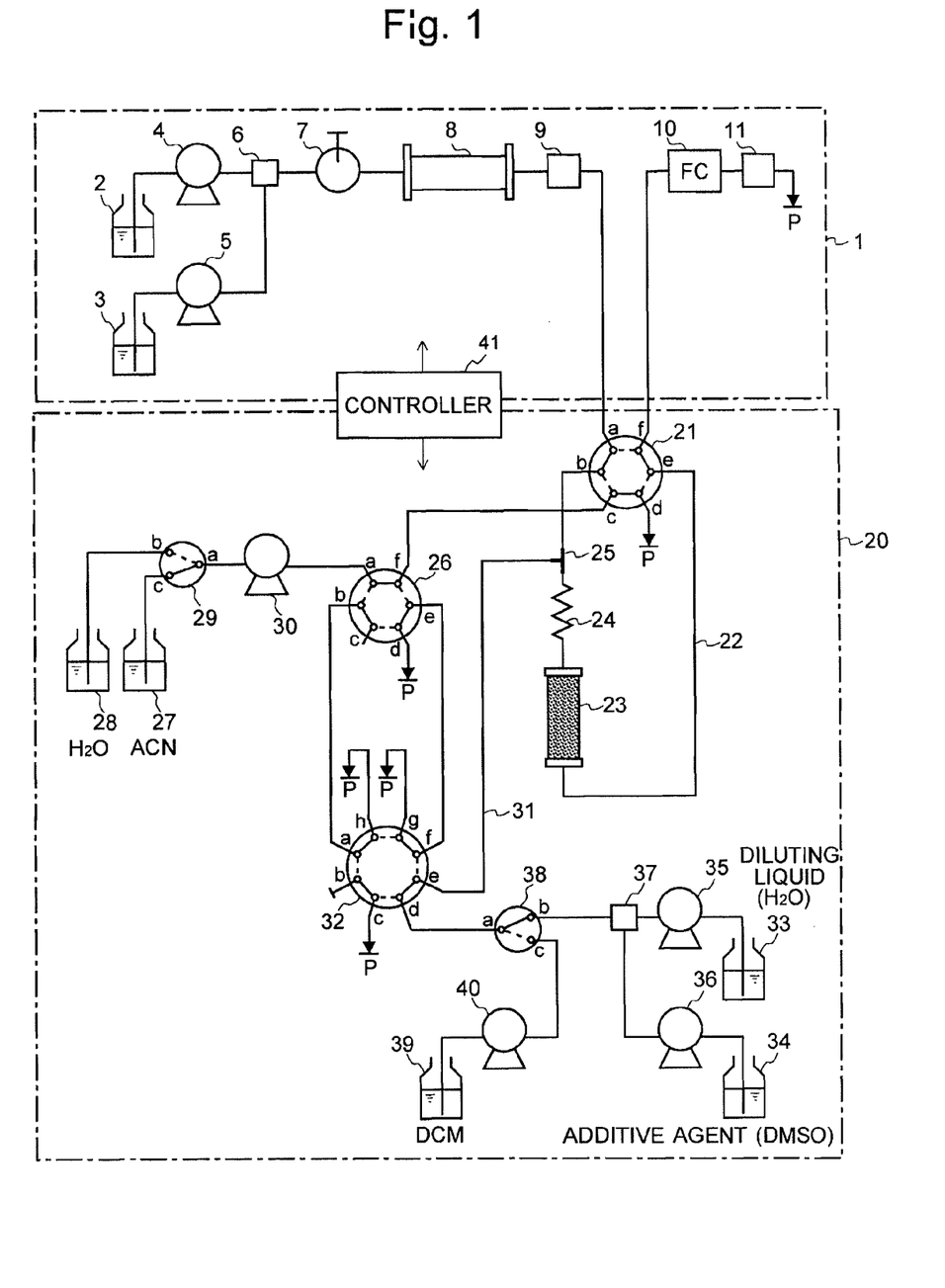
FIG. 1 is a schematic configuration diagram of a preparative liquid chromatograph which is one embodiment of the preparative separation/purification system according to the present invention.

One embodiment of the preparative separation/purification system according to the present invention is hereinafter described with reference to FIG. 1. FIG. 1 is a schematic configuration diagram of a preparative liquid chromatograph which is an embodiment of the preparative separation/purification system according to the present invention.

A liquid chromatograph unit (LC unit) 1 includes first and second pumps 4 and 5, an injector 7, a separation column 8, a first detector 9, a fraction collector 10, a second detector 11 and other components. The pump 4 draws and sends a first mobile phase (e.g. water) prepared in a first mobile phase container 2, while the other pump 5 draws and sends a second mobile phase (e.g. acetonitrile or other organic solvents) prepared in a second mobile phase container 3. The two mobile phases are mixed by the mixer 6 and supplied via the injector 7 into the separation column 8. The first and second pumps 4 and 5, which correspond to the solution supply means of the present invention, each have a controllable flow velocity that can be changed with the elapse of time. Using these pumps, the system can perform a high-pressure gradient liquid-supply process in which the compositional ratio of the first and second mobile phases is changed with time. Naturally, performing the gradient liquid-supply process is purely optional; it is possible to use a single mobile phase or a mobile phase having at a constant compositional ratio.

At the injector 7, a liquid sample selected by an autosampler is automatically injected into the mobile phase at a predetermined timing. The liquid sample, being carried by the mobile phase, is introduced into separation column 8. While passing through the separation column, the various components (compounds) in the liquid sample are temporally separated and eventually exit from the outlet end of the separation column 8. The first detector 9, which is located downstream of the separation column 8, is, for example, an ultraviolet-visible spectrophotometer. The fraction collector 10 separately collects fractions of the eluate, each containing a target compound, by a process to be described later. The second detector 11 is used to verify the trapping conditions by checking whether a target component is contained in the eluate that has passed through the trap column 23.

The trapping unit 20 includes six-port valves 21 and 26 as well as an eight-way valve 32 to change the passage configuration in a manner to be described later. Each of these valves 21, 26 and 32 can be switched between the two passage configurations indicated respectively by the solid and dotted lines in FIG. 1. The eluate exiting from the first detector 9 is introduced into port a of the six-port valve 21, whose port f is connected with the inlet of the fraction collector 10. Ports b and e of the six-port valve 21 are connected by a trapping passage 22 in which a trap column 23, a mixing coil 24 and a T-joint 25 are provided. Port c of the six-port valve 21 is connected to port f of the other six-port valve 26. The remaining end of the T-joint 25 is connected to port e of the eight-way valve 32. The passage connecting these two devices serves as a mixed liquid passage 31.

For the purpose of washing the trapping passage 22 inclusive of the trap column 23 or replacing the eluate with a diluting liquid, a third pump 30 sends either the organic solvent (acetonitrile in the present example) or water prepared in the first and second washing liquid containers 27 and 28 according to the switching of a two-way valve 29. A fourth pump 35, which corresponds to the diluting liquid supply means in the present invention, draws and sends a diluting liquid (which is water in the present example but may be an organic solvent or other liquids) prepared in a diluting liquid container 33, while a fifth pump 36, which constitutes the additive-mixing means in the present invention, draws and sends an additive agent (e.g. dimethyl sulfoxide) prepared in an additive agent container 34. Then, the diluting liquid and the additive agent are mixed by a mixer 37. By appropriately setting the flow velocities of the fourth and fifth pumps 35 and 36, it is possible to arbitrarily regulate the mixture ratio of the diluting liquid and the additive agent. A two-way valve 38 is provided between the mixer 37 and the eight-way valve 32 to select either the mixture of the diluting liquid and the additive agent or an eluting solvent (e.g. dichloromethane) having a high elution capability which is drawn from an eluting solvent container 39 by a sixth supply valve 40. Port d of the six-port valve 21, port d of the six-port valve 26, and ports c, h and g of the eight-way valve 32 are all connected to a disposal port P.

The control unit 41 including a central processing unit (CPU) and other components operates according to a preset program to control the switching of the valves 21, 26, 29, 32 and 38, the on/off action and liquid-supply velocities of the pumps 4, 5, 30, 35, 36 and 40, the operation of the injector 7 and other components of the LC unit 1 and the trapping unit 20 while monitoring the detection signals from the first detector 9.

An operation of the present preparative liquid chromatograph is hereinafter described, focusing on the operation of capturing a component into the trap column.

To begin with, in the trapping unit 20, the six-port valve 21 is set to the connection configuration as indicated by the dotted lines, and the six-port valve 26 and the eight-way valve 32 as indicated by the solid lines. Then, the third pump 30 is activated to draw and send acetonitrile (ACN) from the first washing liquid container 27 selected by the two-way valve 29. The drawn liquid flows from ports a and f of the six-port valve 26 through ports c and b of the six-port valves 21 into the trapping passage 22, to be eventually discharged through ports e and d of the six-port valve 26 to the discharge port P. By this process, the trapping passage 22 including the trap column 23 and the mixing coil 24 is entirely washed with acetonitrile, and any component that is soluble in the organic solvent is removed from among the unwanted components remaining within the passage 22.

Next, with the valves 21, 26 and 32 maintained in the same state, the two-way valve 29 is switched to the connection configuration indicated by the dotted lines to draw and send water from the second washing liquid container 28 by the third pump 30. By this process, the trapping passage 22 including the trap column 23 and the mixing coil 24 is entirely washed with water, and acetonitrile is replaced with the water.

Subsequently, the third pump 30 is deactivated and the fourth and fifth pumps 35 and 36 are activated to send a mixture of water and additive agent mixed at a ratio determined by the flow velocities of these two pumps. In this stage, the connection configuration of the two-way valve 38 is as indicated by the solid lines; the mixed liquid flows through ports d and e of the eight-way valve 32 into the mixed liquid passage 31, and then passes through the T-joint 25 into the trapping passage 22 toward the mixing coil 24 and the trap column 23 (i.e. in the downward direction in FIG. 1). During this process, the mixed liquid of water and additive agent replaces the water that has been present within the mixed liquid passage 31 between the eight-way valve 32 and the T-joint 25 and also within the passage between the T-joint 25 and the trap column 23 in the trapping passage 22. It should be noted that, when no additive agent is drawn and sent, only the diluting liquid will flow from the diluting liquid container 33 to the T-joint 25 through a passage including the mixed liquid passage 31 by way of ports d and e of the eight-way valve 32. Therefore, this passage corresponds to the diluting liquid supply passage in the present invention.

Subsequently, the fourth and fifth pumps 35 and 36 are deactivated, and the third pump 30 is once more activated to send water, which pushes the mixed liquid remaining in a portion of the trapping passage 22 toward the disposal port P and eventually fills the entire trapping passage 22. Consequently, the mixed liquid of water and additive agent is left in the mixed liquid passage 31 between the eight-way valve 32 and the T-joint 25 while the trapping passage 22 is entirely filled with water.

After that, the six-port valve 26 is switched from the connection configuration indicated by the solid lines to the configuration indicated by the dotted lines, the third pump 30 is deactivated, and the fourth and fifth pumps 35 and 36 are re-activated. The switching of the passage of the six-port valve 26 makes port c of the six-port valve 21 connected to the disposal port P via ports f and e of the six-port valve 26 and ports f and g of the eight-way valve 32. This time, the mixed liquid that is introduced through the mixed liquid passage 31 and the T-joint 25 into the trapping passage 22 by the liquid-supplying action of the fourth and fifth pumps 35 and 36 flows upwards in FIG. 1, i.e. in the direction toward port b of the six-port valve 21 and not toward the mixing coil 24, to be eventually discharged to the disposal port P after passing through the six-port valve 26 and the eight-way valve 32. As a result, the water present within the trapping passage 22 between port b of the six-port valve 21 and the T-joint 25 (more exactly, its branch point) is replaced with the mixed liquid. The mixed liquid also fills the passage between the mixer 37 and the T-joint 25, including the mixed liquid passage 31. On the other hand, the section of the trapping passage 22 between the T-joint 25 and port e of the six-port valve 21, i.e. the passage including the trap column 23 and the mixing coil 24, is filled with water.

In the previously described manner, the passages in the trapping unit 20 are filled with water or the mixed liquid. This is the initial condition from which an analysis by the LC unit 1, i.e. the component-separating operation, is initiated as follows: The first and second pumps 4 and 5 are activated to supply the mobile phase into the separation column 8 at a constant flow rate, and a liquid sample is injected from the injector 7 into the mobile phase at a predetermined timing. In this process, the six-port valve 21 is maintained in the connection configuration indicated by the dotted lines so as to directly send the eluate from the separation column 8 to the fraction collector 10 and not to the trapping passage 22. Meanwhile, with the eight-way valve 32 set to the connection configuration indicated by the dotted lines, the fourth and fifth pumps 35 and 36 are activated. By this process, the mixed liquid of water and additive agent is discharged via ports d and c of the eight-way valve 32 to the disposal port P.

While the injected liquid sample passes through the separation column 8, various components (compounds) contained in the sample are separated. These components arrive at the first detector 9 with time differences and are detected in their order of arrival. When, based on the detection signals produced by the first detector 9, it is determined that a target component has been eluted, the control unit 41 switches both the six-port valve 21 and the eight-way valve 32 to the connection configuration indicated by the solid lines. Then, the eluate from the separation column 8 begins to flow into the trapping passage 22, and the mixed liquid of water and additive agent begins to be supplied from the T-joint 25 into the trapping passage 22. Thus, both the eluate from the separation column 8 and the mixed liquid are merged together to be introduced into the mixing coil 24, where they are adequately mixed. As already stated, the mixed liquid contains water and the additive agent, the water serving as the diluting liquid. Therefore, the mobile phase in the eluate is diluted with water, and its elution capability decreases.

There is a delay between the point in time where a target compound dissolved in the mobile phase passes through the first detector 9 and the point in time where the compound enters the trapping passage 22. This delay is determined by the flow velocity, pipe length and other factors. After this delay time has elapsed, the target compound begins to enter the trapping passage 22. The target compound passes through the mixing coil 24 before flowing into the trap column 23. As explained earlier, the elution capability of the mobile phase is adequately decreased in the previous stage, i.e. in the mixing coil 24, by the diluting process using water. Therefore, the target compound can be adsorbed onto the adsorbent filled in the trap column 23. After the target compound has been thus removed, the mobile phase and the mixed liquid exit from the outlet end of the trap column 23 and return to the LC unit 1 via the six-port valve 21. In general, most of the compounds to be collected in this manner are barely soluble in water. Therefore, when water is merged with the mobile phase at the T-joint 25 and thereby decreases the solubility of the mobile phase, the target compound and other foreign components made of various compounds may precipitate. However, in the system of the present embodiment, the additive agent prevents the precipitation of those compounds. Therefore, no compound will precipitate and clog the trapping passage 22, trap column 23 or other components.

After the target compound has been captured in the trap column 23, the component separation process in the LC unit is discontinued. If the process of collecting the target compound captured in the trap column 23 should be subsequently performed, the system will operate as follows: The two-way valve 38 is switched to the connection configuration indicated by the dotted lines, and the sixth supply valve 40 is activated to supply dichloromethane (i.e. the eluting solvent) through the mixed liquid passage 31 and the trapping passage 22 into the trap column 23. In advance of this operation, it is possible to remove impurities and other matters remaining in the trapping passage 22 by passing water (i.e. the washing liquid) through the trapping passage 22 inclusive of the trap column 23. When dichloromethane is supplied into the trap column 23, the target compound captured therein will be eluted within a short period of time. The eluate containing this target compound is introduced via the six-port valve 21 into the fraction collector 10, to be eventually collected into a designated container. The collected eluate can be heated or subjected to centrifugal separation under vacuum to extract the target compound in solid forms.

Figure 2:
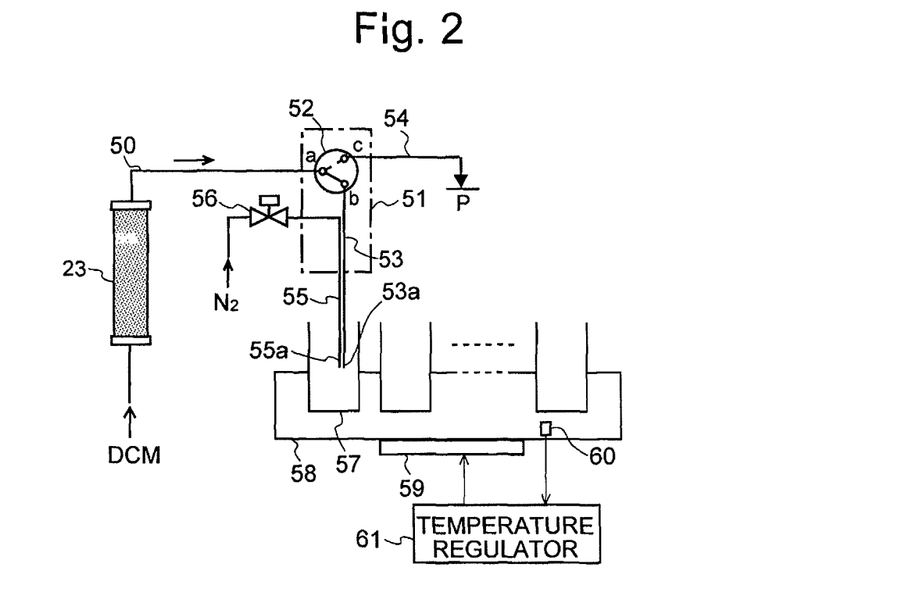
FIG. 2 is a diagram showing an example of the configuration of a system for vaporizing and drying an eluate from a trap column.

Alternatively, an apparatus with the vaporizing and drying functions, as shown in FIG. 2, may be used as the fraction collector 10 so that the separation, vaporization and drying of the compound obtained from the trap column 23 can be performed online. In this system, the trap column 23 with a target compound captured therein, filled with water or a water-containing mobile phase, is held in a substantially vertical position, and dichloromethane is introduced, at low speeds, into the trap column 23 from its lower end. Dichloromethane has a specific gravity larger than that of water and is poorly soluble to water. Therefore, as dichloromethane is introduced, the water present in the trap column 23 is pushed upwards, to be eventually extruded from the upper end of the trap column 23 into a discharge passage 50.

At this point, a two-way valve 52 is in the connection configuration indicated by the dotted line in FIG. 2, so that the water is disposed of through a disposal passage 54 to the disposal port P. Since the target compound captured in the trap column 23 is soluble in dichloromethane, the eluate exiting from the upper end of the trap column 23 begins to contain the target compound when the solvent in the eluate changes from water to dichloromethane. The period of time that elapses until dichloromethane begins to exit can be calculated from the void volume of the trap column 23 and the supply velocity of dichloromethane. After the elapse of the calculated period of time or a longer period of time inclusive of an appropriate allowance, the two-way valve 52 is switched to the connection configuration indicated by the solid line. In advance of this switching operation, a temperature regulator 61 begins to supply a heating current to a heater 59, while monitoring the temperature measured with a temperature sensor 60 provided in a container rack 58, to maintain the container rack 58 at a predetermined constant temperature (e.g. around 40 degrees Celsius).

After the two-way valve 52 is switched, dichloromethane containing the target compound flows into a preparative separation passage 53 and drips from a solution nozzle 53*a* at the lower end of the same passage. Then, when an on/off valve 56 is opened, nitrogen gas is supplied through a gas passage 55 and ejected from a gas ejection nozzle 55*a*. By this flow of gas, the eluate dripping from the solution nozzle 53*a* is separated into droplets and scattered around, and these droplets adhere to the inner circumferential wall surface of one of the collection containers 57. Since these collection containers 57 are heated to the predetermined temperature by heat conduction from the container rack 58 and dichloromethane is highly volatile, the solvent in the droplets immediately vaporizes upon coming in contact with the inner circumferential wall surface of the collection container 57, leaving the target compound precipitated in solid forms. A fraction collection head 51, with the two-way valve 52 embedded therein, can be moved to a point above any one of the collection containers 57, and the target compound can be collected into a designated collection container 57.

For some kinds of compounds, even if the mobile phase is diluted with water or other diluting liquids, the trap column 23 does not exhibit an adequate retaining power and hence cannot assuredly capture the target compound. In such a case, it is possible to choose an appropriate additive agent that not only prevents the precipitation of foreign compounds but also increases the retaining power of the trap column 23 to ensure the capturing. Specifically, for example, if the target component is an ionized compound that cannot be adequately captured in the trap column under normal conditions, it is possible to use an oppositely charged ion-pair reagent; the ion-pair reagent forms a hydrophobic ion pair with the target component and thereby increases the retaining power for holding the target component on the mobile phase in the trap column. Examples of such additive agents include pentafluoropropionic acid and heptafluorobutyric acid, both of which are effective as an ion-pair reagent for basic compounds.

In the preparative liquid chromatograph system of the previous embodiment, it is possible to control the capturing conditions so that a variety of compounds requiring different levels of retaining power in the trap column 23 can be assuredly captured. This can be achieved by changing, with time, the flow velocity in the fourth and fifth pumps 35 and 36 so as to vary the mixture ratio of the diluting liquid and the additive agent. This enables the present system to capture a larger variety of compounds with the trap column 23 and hence expands its application range.

Figure 3:
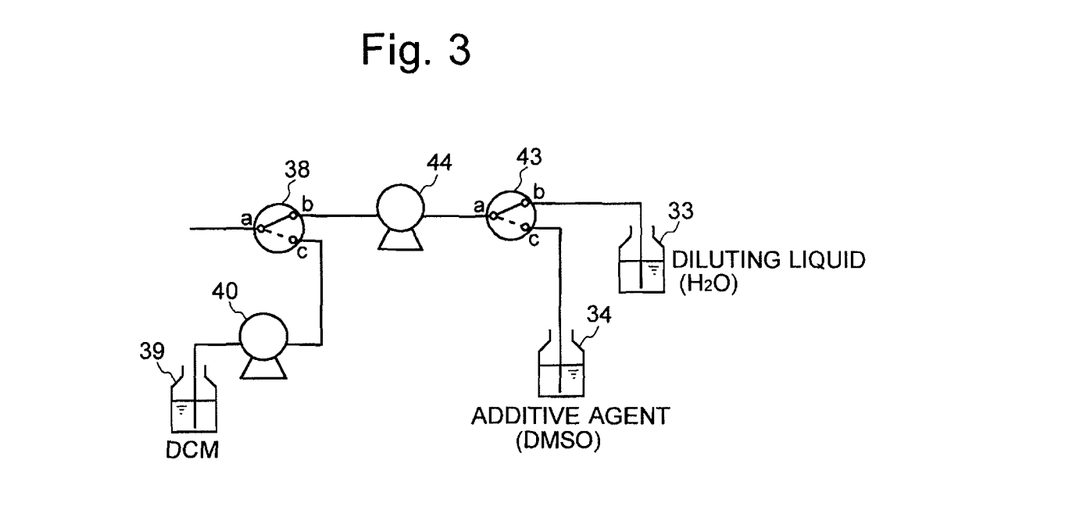
FIG. 3 is a schematic diagram showing the main components of a preparative liquid chromatograph which is another embodiment of the preparative separation/purification system according to the present invention.

In the embodiment shown in FIG. 1, a so-called high-pressure gradient liquid-supply system is used, in which the mixture of the diluting liquid and the additive agent is prepared by separately drawing and sending the diluting liquid and the additive agent by the pumps 35 and 36 and then mixing the two liquids at a point downstream of the pumps. Alternatively, a low-pressure gradient liquid-supply system may be used. FIG. 3 shows a configuration of the main components of this system, which operates as follows: Either the diluting liquid or the additive agent is selected with a two-way valve 43, and the selected liquid is drawn by a pump 44. The two-way valve 43 is switched at appropriate timings to alternately send the diluting liquid and the additive agent to the pump 44 in a time-sharing manner. The two liquids are stirred and mixed within the pump 44, and the resultant mixture is sent out.

The system in the previous embodiment has an online trapping system in which the LC unit 1 is directly connected to the trapping unit 20 and an eluate whose components have been separated by the separation column 8 is directly introduced into the trap column 23 to capture a target compound. Alternatively, it is possible to construct an offline trapping system in which an eluate whose components have been separated by the separation column 8 is temporarily collected into a fraction collector and the collected eluate is introduced into the trapping unit 20 to capture a target component in the eluate by the trap column 23.

It should be noted that any of the foregoing embodiments is a mere example of the present invention, and any change, modification or addition appropriately made within the spirit of the present invention will evidently fall within the scope of claims of the present patent application.

The invention claimed is:

1. A preparative separation/purification system, comprising:
   a source of a sample-introducing solvent which is an organic solvent or a mixture of the organic solvent and water;
   a source of an additive agent having a higher polarity than that of the organic solvent of the sample-introducing solvent;
   a trapping passage including a trap column;
   a solution supply means for sending, to the trapping passage, a solution having a captured target component from a liquid sample dissolved in a sample-introducing solvent which is the organic solvent or the mixture of the organic solvent and water;
   a diluting liquid supply passage for merging a diluting liquid into the solution at a point before the trap column in the trapping passage in order to lower an elution capability of the sample-introducing solvent;
   a diluting liquid supply means, provided in the diluting liquid supply passage, for supplying the diluting liquid; and
   an additive-mixing means for mixing into the diluting liquid the additive agent having the higher polarity than that of the organic solvent of the sample-introducing solvent for preventing the target component and a foreign compound in the solution from precipitating due to a decrease in a solubility of target component and the foreign compound in the sample-introducing solvent occurring with lowering of the elution capability of the solvent caused by a mixture of the diluting liquid.

2. The preparative separation/purification system according to claim 1, further comprising a means for changing, with time, a compositional ratio of the diluting liquid and the additive agent.

3. The preparative separation/purification system according to claim 2, the additive-mixing means comprising:
   an additive supply passage connected to a point on the diluting liquid supply passage;
   an additive supply means for drawing and supplying the additive agent in the additive supply passage; and
   a control means for changing liquid supply rates of the diluting liquid supply means and the additive supply means so that the compositional ratio of the diluting liquid and the additive agent changes with time.

4. The preparative separation/purification system according to claim 3, wherein the additive agent has properties that prevent precipitation in the sample-introducing solvent and also adjust a degree of retention of the target component on a stationary phase in the trap column working in a reverse-phase mode by controlling hydrophilic or hydrophobic characteristics of the solvent.

5. The preparative separation/purification system according to claim 4, further comprising a separation column of a liquid chromatograph including the sample-introducing solvent, with a liquid sample carried thereby, and wherein the trapping passage includes an eluate from the separation column so that a target component in the eluate will be captured by the trap column.

6. The preparative separation/purification system according to claim 3, further comprising a separation column of a liquid chromatograph includes the sample-introducing solvent, with a liquid sample carried thereby, and wherein the trapping passage includes an eluate from the separation column so that a target component in the eluate will be captured by the trap column.

7. The preparative separation/purification system according to claim 2, the additive-mixing means comprising:
   a passage selection means for switching, between the diluting liquid and the additive agent, the liquid to be drawn by the diluting liquid supply means; and
   a control means for controlling a period of time to connect each passage by the passage selection means so as to change the compositional ratio of the diluting liquid and the additive agent with time.

8. The preparative separation/purification system according to claim 7, wherein the additive agent has properties that prevent precipitation in the sample-introducing solvent and also adjust a degree of retention of the target component on a stationary phase in the trap column working in a reverse-phase mode by controlling hydrophilic or hydrophobic characteristics of the solvent.

9. The preparative separation/purification system according to claim 8, further comprising a separation column of a liquid chromatograph including the sample-introducing solvent, with a liquid sample carried thereby, and wherein the trapping passage includes an eluate from the separation column so that a target component in the eluate will be captured by the trap column.

10. The preparative separation/purification system according to claim 7, further comprising a separation column of a liquid chromatograph including the sample-introducing solvent, with a liquid sample carried thereby, and wherein the trapping passage includes an eluate from the separation column so that a target component in the eluate will be captured by the trap column.

11. The preparative separation/purification system according to claim 2, wherein the additive agent has properties that prevent precipitation in the sample-introducing solvent and also adjust a degree of retention of the target component on a stationary phase in the trap column working in a reverse-phase mode by controlling hydrophilic or hydrophobic characteristics of the solvent.

12. The preparative separation/purification system according to claim 11, wherein further comprising a separation column of a liquid chromatograph including the sample-introducing solvent, with a liquid sample carried thereby, and wherein the trapping passage includes an eluate from the separation column so that a target component in the eluate will be captured by the trap column.

13. The preparative separation/purification system according to claim 2, further comprising a separation column of a liquid chromatograph including the sample-introducing solvent, with a liquid sample carried thereby, and wherein the trapping passage includes an eluate from the separation column so that a target component in the eluate will be captured by the trap column.

14. The preparative separation/purification system according to claim 1, the additive agent has properties that prevent precipitation in the sample-introducing solvent and also adjust a degree of retention of the target component on a stationary phase in the trap column working in a reverse-phase mode by controlling hydrophilic or hydrophobic characteristics of the solvent.

15. The preparative separation/purification system according to claim 14, further comprising a separation column of a liquid chromatograph including the sample-introducing solvent, with a liquid sample carried thereby, and the trapping passage includes an eluate from the separation column so that a target component in the eluate will be captured by the trap column.

16. The preparative separation/purification system according to claim 1, further comprising a separation column of a liquid chromatograph including the sample-introducing solvent, with a liquid sample carried thereby, and wherein the trapping passage includes an eluate from the separation column so that a target component in the eluate will be captured by the trap column.

\* \* \* \* \*